(12) United States Patent
Plazek et al.

(10) Patent No.: US 12,144,312 B2
(45) Date of Patent: Nov. 19, 2024

(54) RACK AND PINION ROLLER GATE SYSTEM FOR A LIVESTOCK TRANSPORTATION VEHICLE, AND METHOD OF OPERATION THEREOF

(71) Applicant: Wilson Trailer Company, Sioux City, IA (US)

(72) Inventors: Brett Plazek, Mount Pleasant, TX (US); Aaron Larson, Yankton, SD (US); David Peterson, Bronson, IA (US)

(73) Assignee: WILSON TRAILER COMPANY, Sioux City, IA (US)

( * ) Notice: Subject to any disclaimer, the term of this patent is extended or adjusted under 35 U.S.C. 154(b) by 176 days.

(21) Appl. No.: 18/071,908

(22) Filed: Nov. 30, 2022

(65) Prior Publication Data

US 2024/0172719 A1 May 30, 2024

(51) Int. Cl.
*A01K 1/00* (2006.01)
*B60P 3/04* (2006.01)
*B62D 33/04* (2006.01)

(52) U.S. Cl.
CPC .......... *A01K 1/0029* (2013.01); *A01K 1/0035* (2013.01); *B60P 3/04* (2013.01); *B62D 33/042* (2013.01)

(58) Field of Classification Search
CPC .. A01K 1/0017; A01K 1/0029; A01K 1/0035; B60P 3/04; B60P 7/14; B62D 33/042; B61D 45/006; B61D 3/163

USPC ................ 410/129, 130, 131, 132, 133, 135
See application file for complete search history.

(56) References Cited

U.S. PATENT DOCUMENTS

| | | | |
|---|---|---|---|
| 8,684,645 B2* | 4/2014 | Hobbs | B60P 7/08 410/142 |
| 2008/0131226 A1* | 6/2008 | Pesson | B61D 45/00 410/129 |
| 2010/0183398 A1* | 6/2010 | Nelson | B06P 7/14 410/129 |
| 2021/0101515 A1* | 4/2021 | Menz | B60P 1/56 |

* cited by examiner

*Primary Examiner* — Joshua J Michener
*Assistant Examiner* — Henry Hooper Mudd
(74) *Attorney, Agent, or Firm* — Jacobson Holman PLLC

(57) ABSTRACT

A roller gate system for a livestock transportation vehicle includes a rack and pinion gate movement system, with a roller gate assembly having toothed rollers connected by a rotatable roller shaft positioned in line with the center of gravity of the roller gate assembly when hanging substantially vertically. The pinion is a roller having a plurality of teeth, and the rack is a track having a plurality of openings for receiving the roller teeth. At each end of the rotatable roller shaft, the toothed roller is fixedly mounted thereto for travel along the track. The toothed rollers operate in unison to move the roller gate assembly in a uniform and smooth manner. By having the toothed rollers and the rotatable roller shaft positioned in line with the center of gravity of the roller gate assembly when hanging substantially vertically, the roller gate assembly remains in a substantially vertical orientation during travel.

20 Claims, 11 Drawing Sheets

RACK AND PINION ROLLER GATE SYSTEM FOR A LIVESTOCK TRANSPORTATION VEHICLE, AND METHOD OF OPERATION THEREOF

BACKGROUND OF THE INVENTION

1. Field of the Invention

The present invention relates generally to a livestock transportation vehicle. More particularly, the present invention relates to such a livestock transportation vehicle having a roller gate system that facilitates providing various configurations of livestock containment compartments.

2. Description of Related Art

A typical prior art vehicle for hauling livestock, such as a towable trailer or a railroad car, includes multiple interior compartments for the function of separating animals. These compartments are usually separated by gates that are fixed to one wall of the vehicle, and that swing closed against the opposite wall to form the compartments. In such a trailer, the number, size, and location of the compartments is determined solely by the number of gates, the distance between them, and their location along the length of the trailer.

Another type of prior art trailer is equipped with a number of movable gates that may slide on, or roll on, tracks, and be secured at various locations within the vehicle so as to allow for variable compartment numbers and sizes based on the gate locations. Such a trailer can be equipped with one or more of these gates, and the gates can be combined with fixed gates so as to customize the vehicle based on the user's needs. These moveable gates, also referred to simply as roller gates, are common in the industry, and there are a variety of methods by which they are supported, guided, and secured. The most common of these methods is to support the gate by means of a roller on each end of the gate that is guided by a track running parallel to the length of the trailer. The gates are then held in usable positions by pins engaging with securement points along the wall.

However, there are various problems associated with the above-described prior art embodiments of roller gates. First, the size and weight of the prior art gate assemblies can make them difficult and cumbersome to move if the gate is simply slid in a track, or if the gate's rollers do not roll easily and in unison.

Second, regardless of whether the gate is sliding or rolling, because each end of the gate can move independently of one another, substantial effort is required to keep the gate moving evenly on its tracks. Otherwise, the gate can bind or jam as a result of one end of the gate "skewing," i.e., moving ahead of the other end. As a result of the tendency of such prior art gate assemblies to skew when being moved, either a user must use both arms fully extended to grasp the gate in attempting to keep both ends of the gate in alignment, or more than one user is required to move a gate without skewing.

Third, if the gate is supported by only one roller per end, and that roller is attached to either the front or the rear face of the gate, the center of gravity of the assembly is not located under the axis of rotation of the roller. As a result, rather than the top and bottom of the gate remaining substantially vertical, the bottom of the gate will tilt forward or backward when hanging under its own weight. Such tilting presents challenges during the securement of the gate in a usable position because the gate must be forced into a vertical position in order to be secured.

Accordingly, a need exists for a movable roller gate that is mechanically simple and reliable, functionally easy to move to, and secure in, a variety of positions along the length of the trailer, and capable of hanging in a substantially vertical orientation so as to minimize swinging as it is being moved.

SUMMARY OF THE INVENTION

It is therefore an object of the present invention to provide a roller gate system that is mechanically simple and reliable, and that facilitates providing various configurations of livestock containment compartments.

It is another object of the present invention to provide a roller gate system having a movable roller gate assembly that is functionally easy for a single user to move to, and secure in, a variety of positions along the length of the trailer.

It is still another object of the present invention to provide a roller gate system having a roller gate assembly that is capable of hanging in a substantially vertical orientation so as to minimize swinging as it is being moved.

It is yet another object of the invention to provide a method of operating a roller gate assembly in a smooth, uniform, and predictable manner that is easy for a single user, even, for example, when using only one hand.

With these and other objects in mind, the present invention advantageously relates to a movable roller gate system having the following two prominent features: (i) a rack and pinion gate movement system and (ii) a roller gate assembly having toothed rollers that are positioned in line with the center of gravity of the roller gate assembly when hanging substantially vertically.

To solve the above-described prior art problem of gate skewing, the present invention provides a roller gate system having a rack and pinion gate movement system. According to the present invention, the "pinion" is a roller having a plurality of teeth, and the "rack" is a track having a plurality of mating openings for receiving therein the teeth of the roller. A matching pair of tracks extend along the trailer or railroad car length, one on each interior side of the trailer. And, a roller gate assembly includes at a top thereof a gate frame crossmember which houses a shaft that extends generally in a horizontal direction from one interior side of the trailer to the other interior side of the trailer. At each end of the shaft, the toothed roller is rotatably mounted for travel along its respective track. By virtue of the rack and pinion system, the toothed rollers operate in unison so as to move the roller gate assembly easily forward and backward in a uniform and smooth manner. And, because the toothed rollers operate in unison, the entire width of the roller gate assembly, which is oriented substantially perpendicular to a longitudinal axis of the trailer or railroad car, is enabled to consistently move in a direction that is substantially parallel to the longitudinal axis of the trailer or railroad car, thereby avoiding any possibility of the skewing that characterizes the above-described prior art roller gates.

To solve the above-described prior art problem of gate tilting, the present invention provides a roller gate system with a roller gate assembly having toothed rollers that are positioned in line with the center of gravity of the roller gate assembly when hanging substantially vertically. As noted above, the roller gate assembly includes at a top thereof a gate frame crossmember which houses a shaft that extends generally in a horizontal direction from one interior side of the trailer to the other interior side of the trailer. That is, rather than having a roller mounted to a front or rear face of a gate as in prior art gates, the present invention employs toothed rollers positioned at each end of a shaft that is located directly above the center of gravity of the roller gate assembly when hanging substantially vertically. By virtue of having the toothed rollers in line with the center of gravity of the roller gate assembly when hanging substantially vertically, the gate remains in a substantially vertical orientation throughout its travel along the tracks.

Furthermore, by virtue of the structural details and functionality of the roller gate system described herein, the present invention provides a method of operating a roller gate assembly in a smooth, uniform, and predictable manner that is easy for a single user, even, for example, when using only one hand. Accordingly, the advantages associated with the rack and pinion roller gate system of the present invention are numerous. First, by virtue of the rack and pinion system, the skewing problem associated with prior art gates is overcome. Because the toothed rollers move in unison along their respective tracks, one end of the roller gate assembly cannot advance either forward or backward without the other end moving along with it. As a result, the roller gate assembly can be moved in a smooth, uniform, and predictable manner. And, as a result of the smooth, uniform, and predictable movement of the roller gate assembly, the movement of the roller gate assembly is easy for a single user, even, for example, when using only one hand.

Furthermore, by virtue of having the toothed rollers positioned in line with the center of gravity of the roller gate assembly when hanging substantially vertically, the tilting problem associated with prior art gates is, in general, minimized. As a result, when being moved along the tracks, the roller gate assembly remains in a substantially vertical orientation, which facilitates smooth, uniform, and predictable movement. In addition, because the roller gate assembly remains in the substantially vertical orientation during its travel along the tracks, once the roller gate assembly reaches its desired position, securement of the roller gate assembly is easy and fast. In fact, because the roller gate assembly remains in the substantially vertical orientation at its new position, securing the roller gate assembly is easy even for a single user, since only one hand is needed to hold the roller gate assembly in position.

The foregoing objects and advantages together with other objects and advantages which will become subsequently apparent reside in the details of construction and operation as more fully hereinafter described, reference being had to the accompanying drawings forming a part hereof, wherein like reference numbers refer to like parts throughout. The accompanying drawings are intended to illustrate the invention, but are not necessarily to scale.

DETAILED DESCRIPTION OF THE PREFERRED EMBODIMENTS

Figure 1:
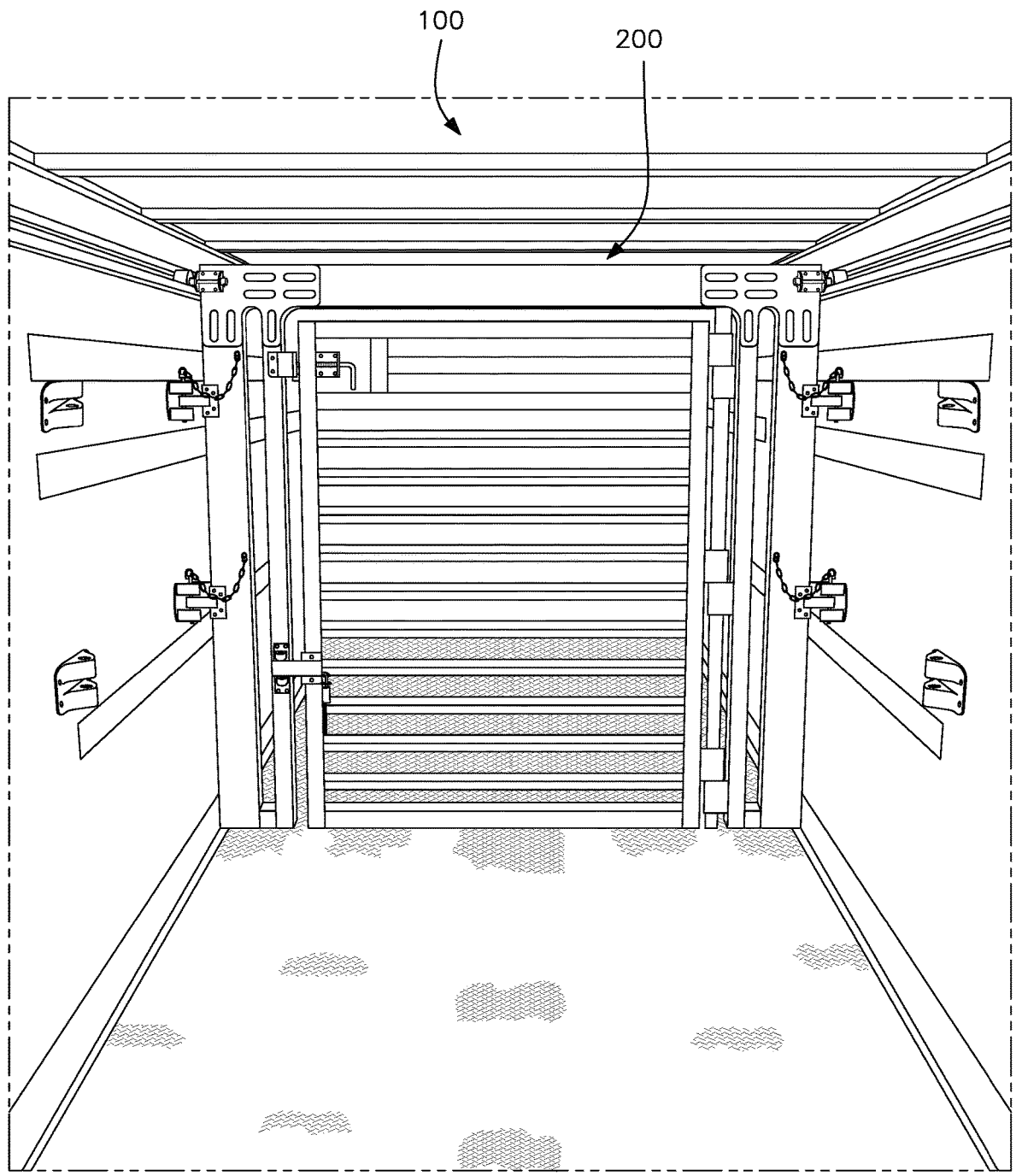
FIG. 1 is an elevational view of an operational side of a movable roller gate of a prior art livestock transportation trailer.

Although only preferred embodiments of the present invention are explained in detail, it is to be understood that the invention is not limited in its scope to the details of construction and arrangement of components set forth in the following description or illustrated in the drawings. As described hereinafter, the present invention is capable of other embodiments and of being practiced or carried out in various ways.

Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

As used herein, for the purposes of this specification, including the appended claims, the terms "about" and "approximately" when modifying numbers expressing a number of sizes, dimensions, portions, shapes, formulations, parameters, percentages, quantities, characteristics, and other numerical values used in the specification and claims, the term is meant to encompass the stated value plus or minus 10%.

As also used herein, the term "operational side," as used in the context of a movable roller gate assembly, means the side or face of the roller gate assembly on which a user is positioned when moving and/or securing the roller gate assembly.

And, as also used herein, the term "left-hand side" means the left side of the livestock trailer body as viewed from the operational side of the roller gate assembly, and the term "right-hand side" means the right side of the livestock trailer body as viewed from the operational side of the roller gate assembly.

Figure 2:
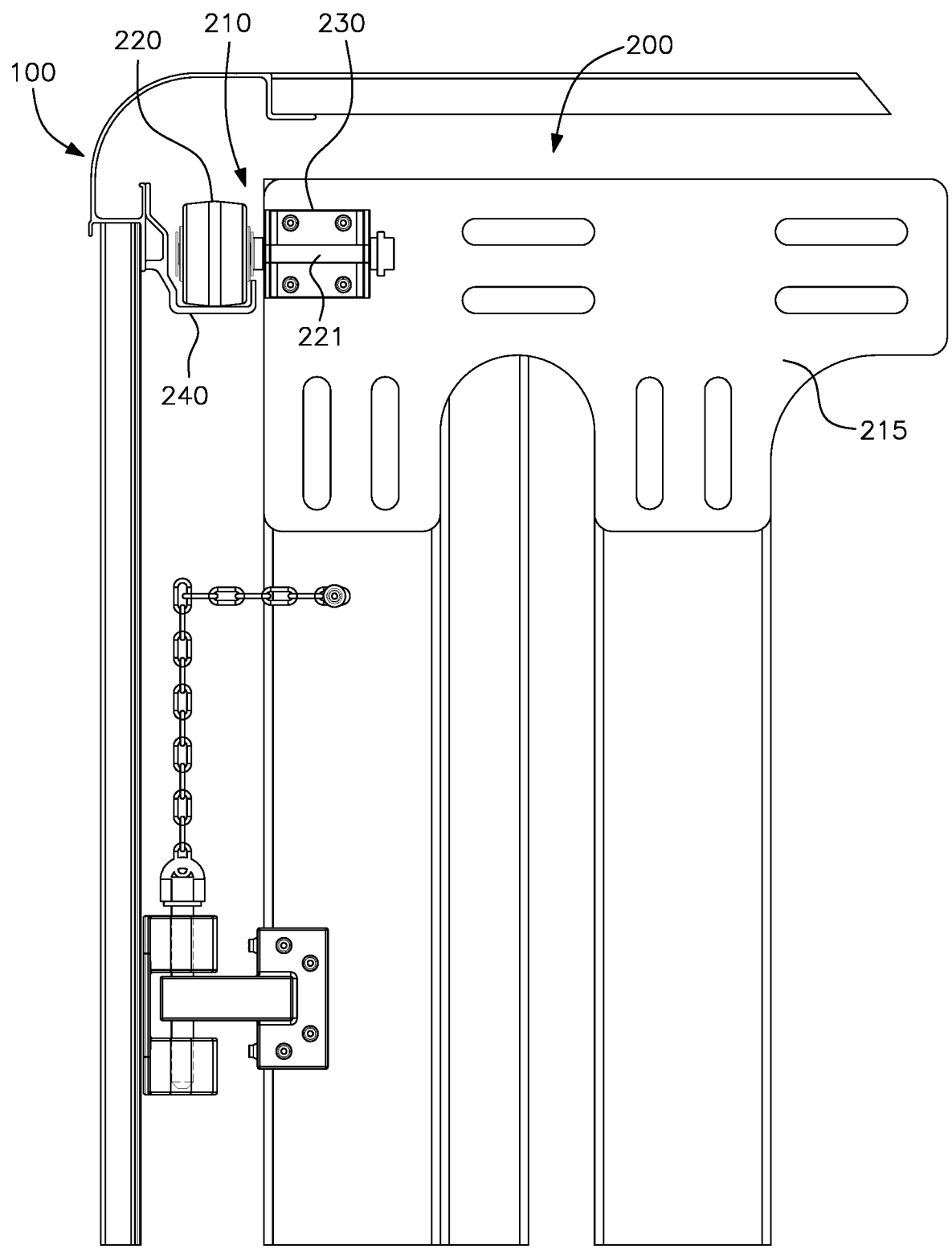
FIG. 2 is an enlarged partial elevational view of the prior art movable roller gate as shown in FIG. 1, illustrating the roller mounted to the operational side of the roller gate.

Before turning to a description of the various features of the present invention, it is helpful to understand the drawbacks of prior art movable roller gates. A prior art movable roller gate system 200 within a livestock trailer 100 is shown in FIG. 1. As shown in FIG. 2, the movable roller gate system 200 has a roller gate assembly 210. Roller gate assembly 210 has a roller gate 215, a roller 220 having a substantially entirely flat rotating surface, a roller shaft 221, and a roller shaft mounting plate 230 attached to an operational side of the roller gate 215. Roller gate system 200 also includes a flat-surfaced, solid track 240 in which roller 220 travels so as to move the roller gate 215 forward and backward. Per FIG. 2, the surface of roller 220 that contacts the flat-surfaced, solid track 240 has a substantially entirely flat rotating contact surface.

However, with prior art roller gate system 200, as described herein, because each end of roller gate 215 can move independently of one another, substantial effort is required to keep the gate moving evenly on its tracks. That is, the gate can bind or jam as a result of one end of the gate "skewing," i.e., moving ahead of the other end. As a result of the tendency of such prior art movable roller gates to skew when being moved, either a user must use both arms fully extended to grasp the gate in attempting to keep both ends of the gate in alignment, or more than one user is required to move a gate without skewing.

In addition, because roller gate 215 is supported at each end by roller shaft mounting plate 230 being attached to the operation side or face of the gate, the center of gravity of the assembly is not located under the axis of rotation of the roller. As a result, rather than the top and bottom of roller gate 215 remaining substantially vertical, the bottom of the gate will tilt forward or backward when hanging under its own weight. Such tilting presents challenges during the securement of the gate in a usable position because the gate must be forced into a vertical position in order to be secured.

Accordingly, to overcome the above-described drawbacks associated with the prior art, the present invention provides a roller gate system that includes a rack and pinion gate movement system, including a roller gate assembly having toothed rollers that are positioned in line with the center of gravity of the roller gate assembly when hanging substantially vertically.

Figure 3:
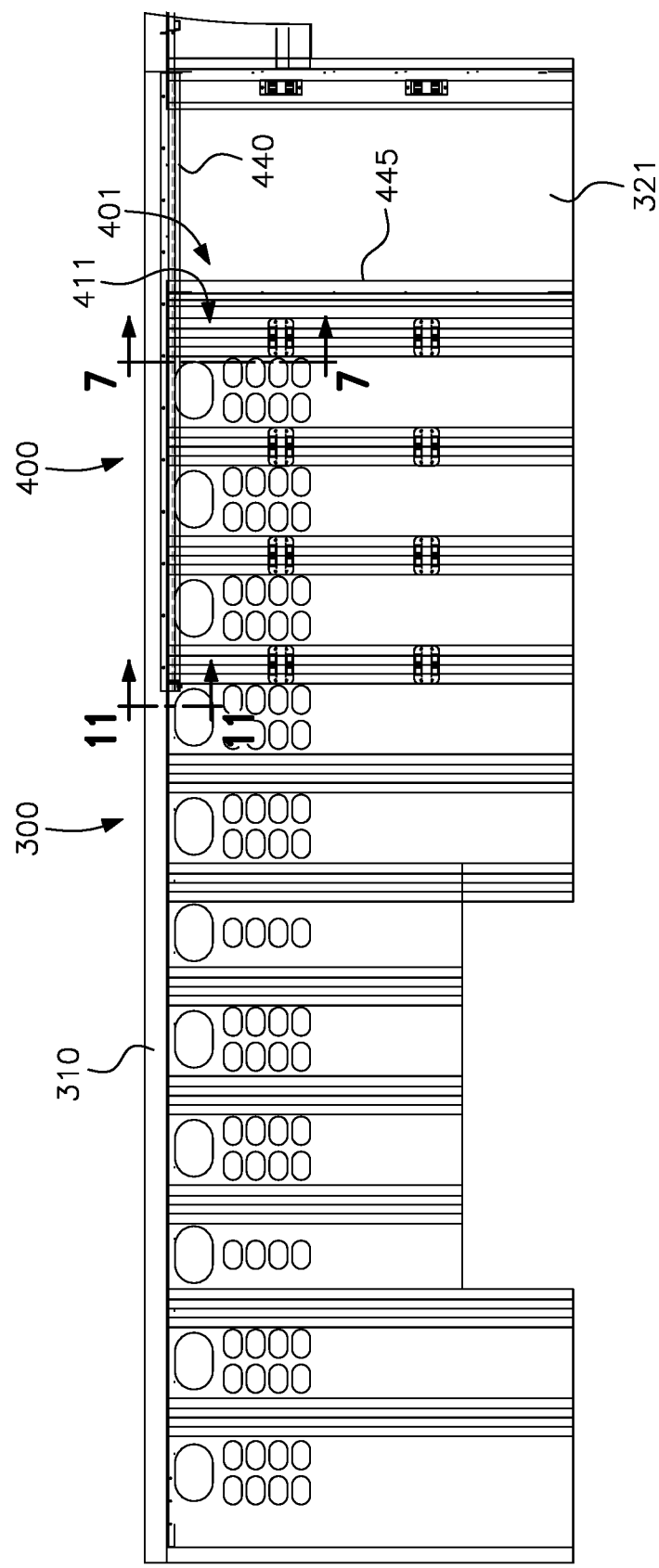
FIG. 3 is a side elevational view and partial interior sectional view of an exterior side of a livestock transportation trailer body having a movable rack and pinion roller gate system according to the present invention.

FIG. 3 is a side elevational view and partial interior sectional view of an exterior side of a livestock transportation trailer body 300 having a rack and pinion roller gate system 400 according to the present invention. As shown in FIG. 3, the livestock trailer body 300, as seen from the perspective of an exterior side 321 of the trailer body, houses a rack and pinion roller gate system 400 that includes a plurality of movable roller gate assemblies 401 configured to be linearly positionable along a length of the trailer body 300. The aforementioned exterior side 321 of the trailer, when viewed from the perspective of the rear end of the trailer body 300, i.e., as seen from the left-hand side of FIG. 3, may also be referred to herein as the right-hand side of the trailer body 300.

In general, according to one embodiment of the present invention, the rack and pinion roller gate system comprises a roller gate assembly including a roller gate, a roller gate frame, a first and a second roller assembly, and a roller shaft disposed between the first and the second roller assembly, and a first and a second roller track upon and along which the roller gate assembly is movable forward and backward. The first and the second roller assembly each include, respectively, a first and a second roller having a plurality of teeth protruding outwardly therefrom, with the first and the second roller being rotatably disposed on, respectively, a first and a second end of the roller shaft. The first and the second roller track each include a plurality of openings therein, each of the openings being configured to receive therein and release therefrom a tooth of a corresponding roller as the first and second rollers rotate in unison to move the roller gate assembly.

Figure 4:
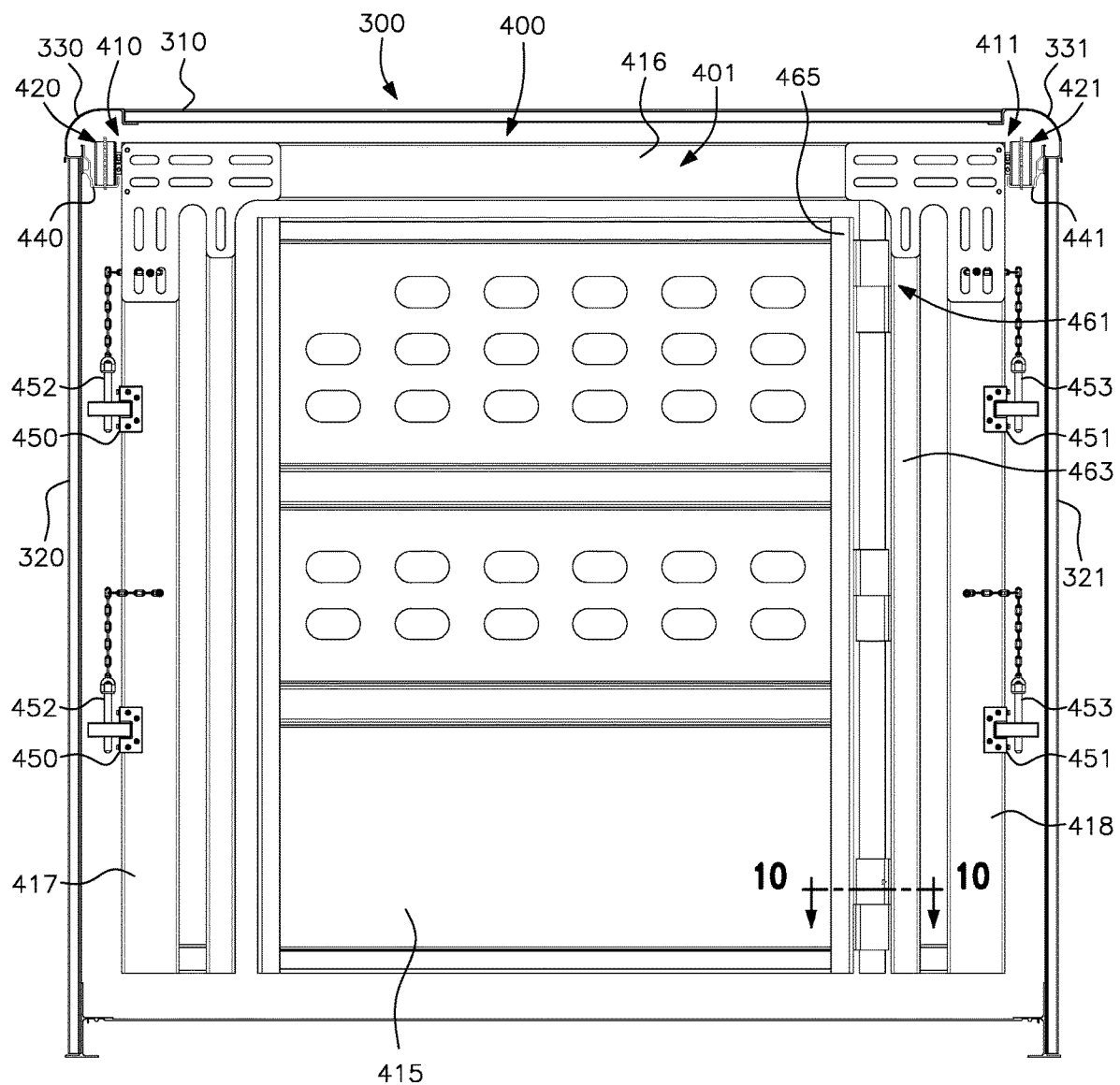
FIG. 4 is an interior cross-sectional view of the trailer body as shown in FIG. 3, illustrating an elevational view of the operational side of a roller gate assembly and associated tracks of the movable roller gate system according to the present invention.

Accordingly, turning to FIG. 4, an interior cross-sectional view of the trailer body 300 as shown in FIG. 3 is presented. More specifically, FIG. 4 illustrates an elevational view of the operational side of a roller gate assembly 401 and associated tracks 440, 441 of the movable roller gate system 400 according to the present invention. More specifically, track 440 is the left-hand side track, and track 441 is the right-hand side track. At the top of FIG. 4, an interior crossmember 310 of the roof of trailer body 300 is shown. For ease of general identification, reference arrows 410 and 411 denote, respectively, the left-hand side and the right-hand side of the roller gate assembly 401.

Figure 5:
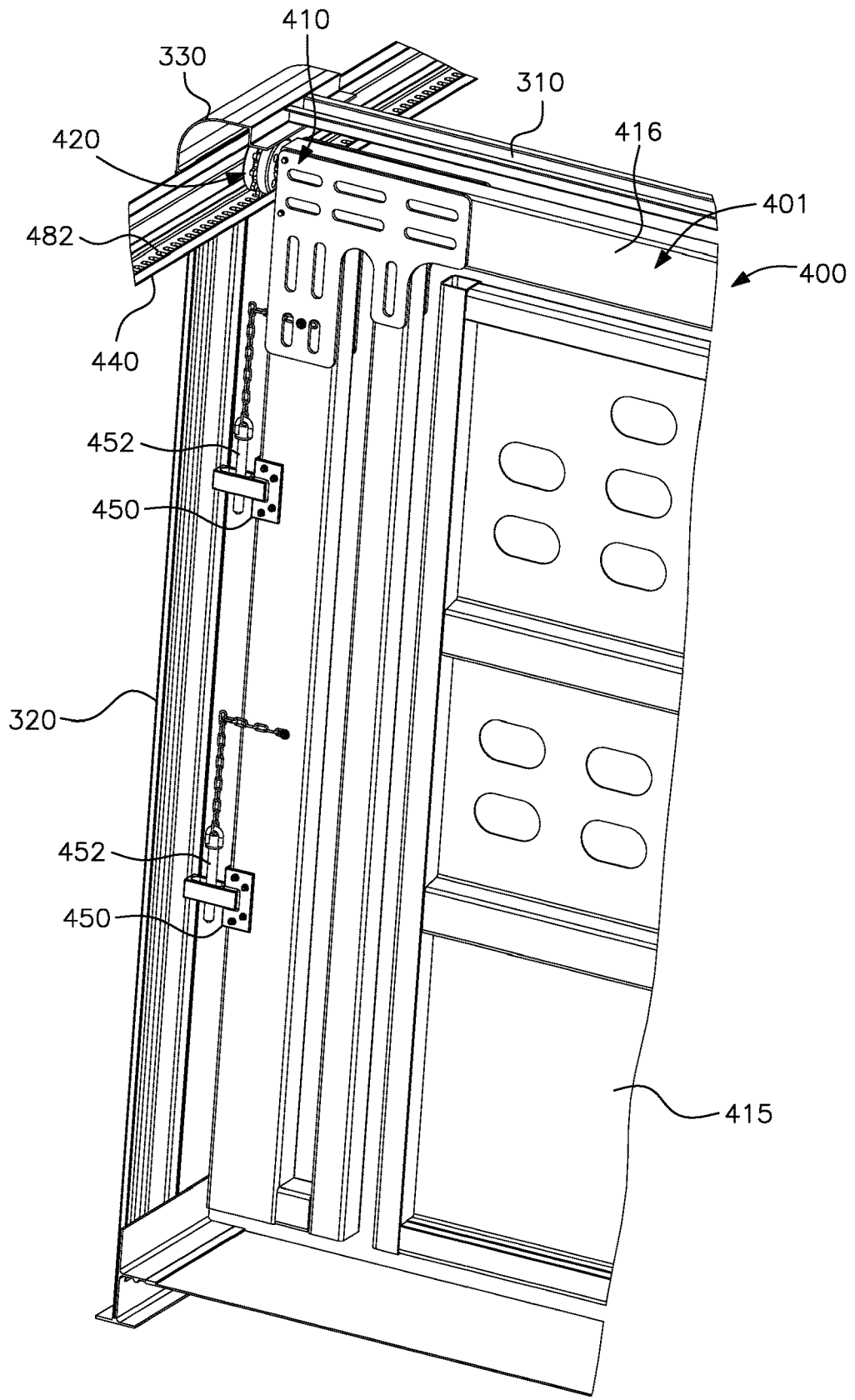
FIG. 5 is an enlarged partial perspective view of the left-hand side of the roller gate assembly and track as shown in FIG. 4, illustrating a first toothed roller and a first track of the movable roller gate system.
Figure 6:
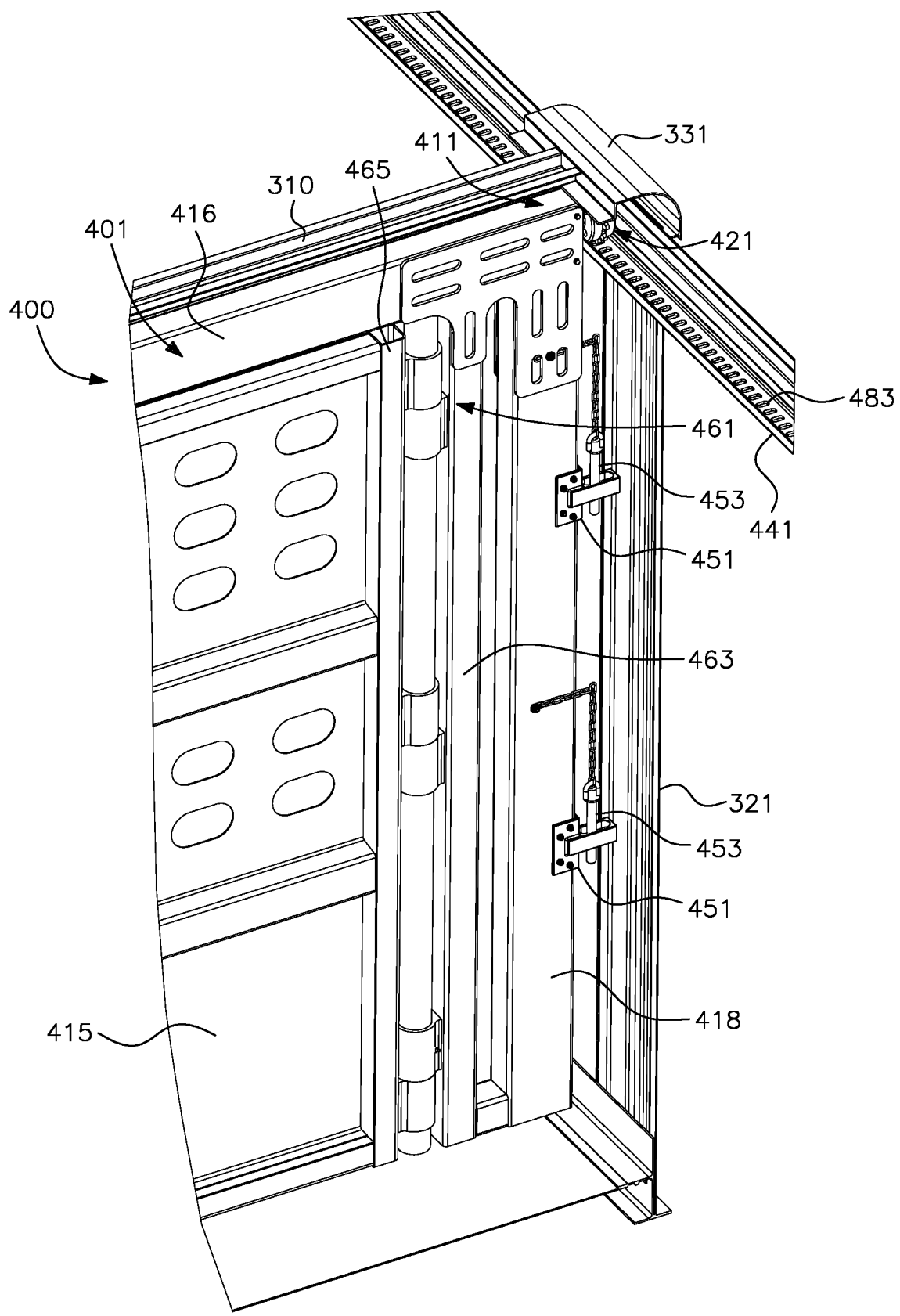
FIG. 6 is an enlarged partial perspective view of the right-hand side of the roller gate assembly and track as shown in FIG. 4, illustrating a second toothed roller and a second track of the movable roller gate system.

FIG. 5 is an enlarged partial perspective view of the left-hand side of the roller gate assembly and track as shown in FIG. 4, illustrating a first toothed roller and a first track of the movable roller gate system 400, and FIG. 6 is an enlarged partial perspective view of the right-hand side of the roller gate assembly and track as shown in FIG. 4, illustrating a second toothed roller and a second track of the movable roller gate system.

Per FIGS. 4, 5, and 6, the rack and pinion roller gate system 400 comprises a roller gate assembly 401, including a roller gate 415, a roller gate frame horizontal crossmember 416, a roller gate frame left-hand side vertical member 417, a roller gate frame right-hand side vertical member 418, a roller gate hinge assembly 461, a first 420 and a second 421 roller assembly, and a roller shaft 490 (see FIG. 8) disposed between the first 420 and the second 421 roller assembly, and within roller gate frame horizontal crossmember 416. The rack and pinion roller gate system 400 includes a first roller track 440 and a second roller track 441 upon and along which the roller gate assembly 401 is movable forward and backward along at least a section of the length of the trailer body 300.

Figure 7:
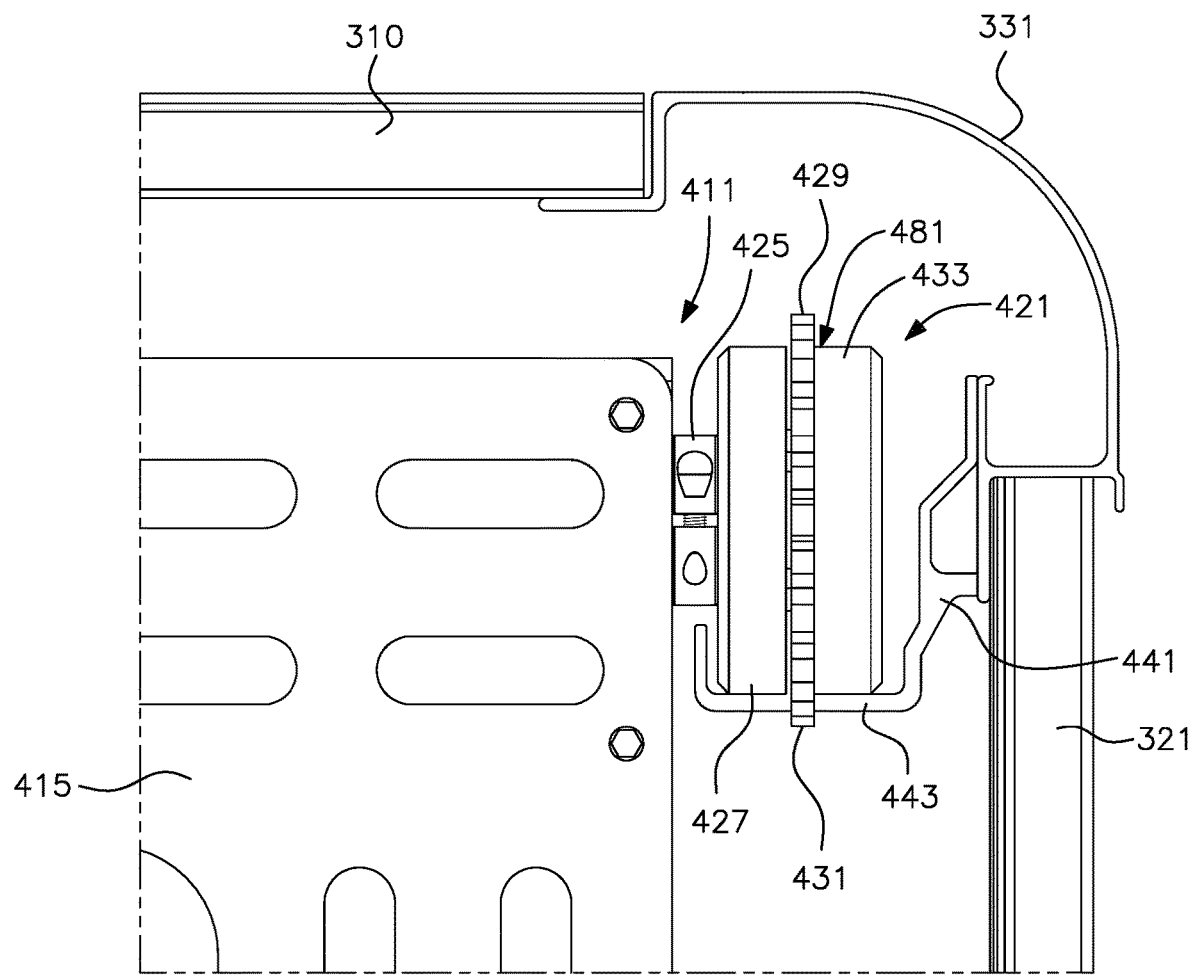
FIG. 7 is an enlarged partial elevational view of the roller gate assembly as shown in FIG. 4 and FIG. 6, illustrating the right-hand side toothed roller and track of the movable roller gate system.
Figure 8:
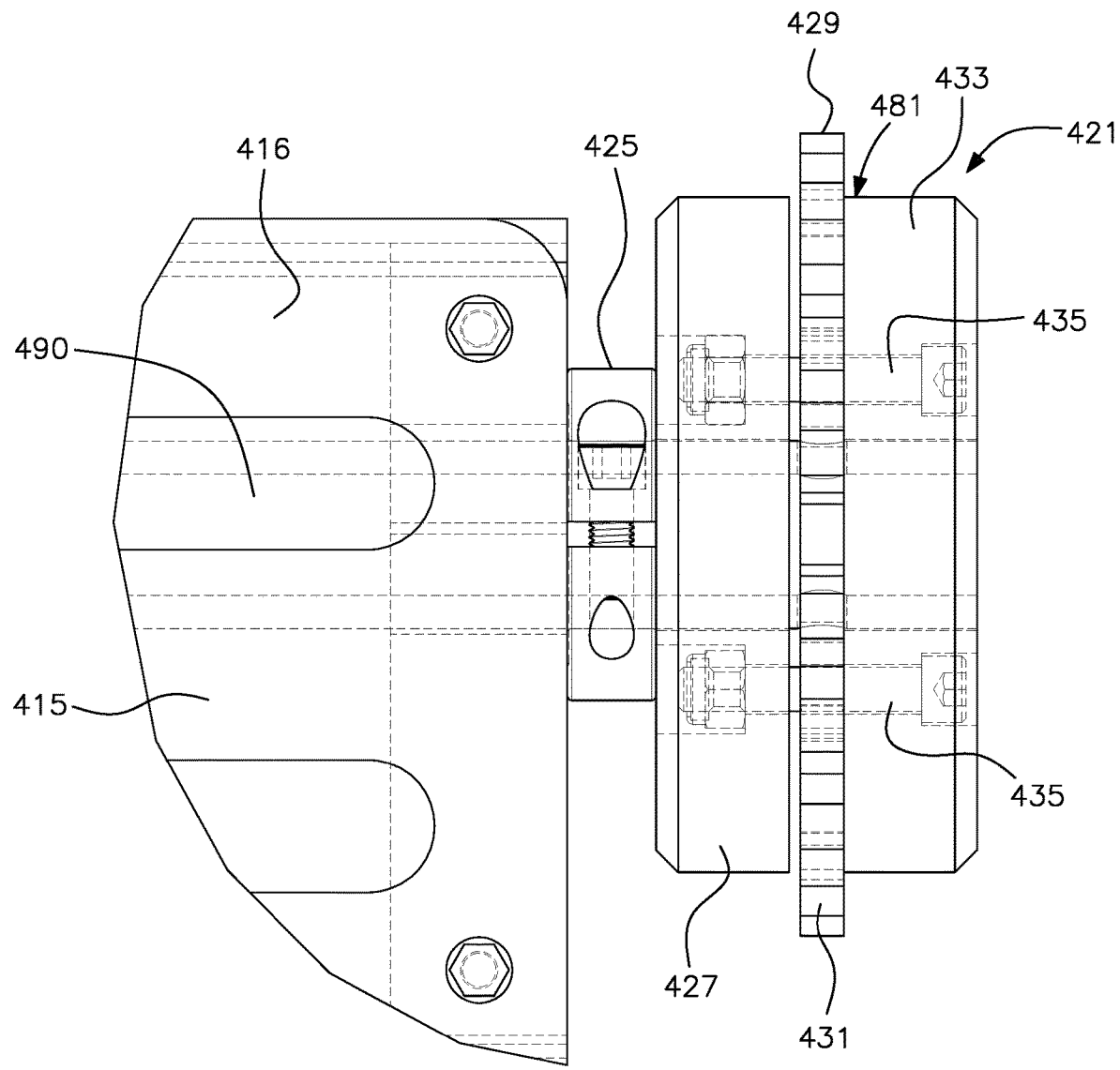
FIG. 8 is a further enlarged partial cross-sectional view of the roller gate assembly as shown in FIG. 7, illustrating details of the right-hand side toothed roller of the roller gate assembly.
Figure 9:
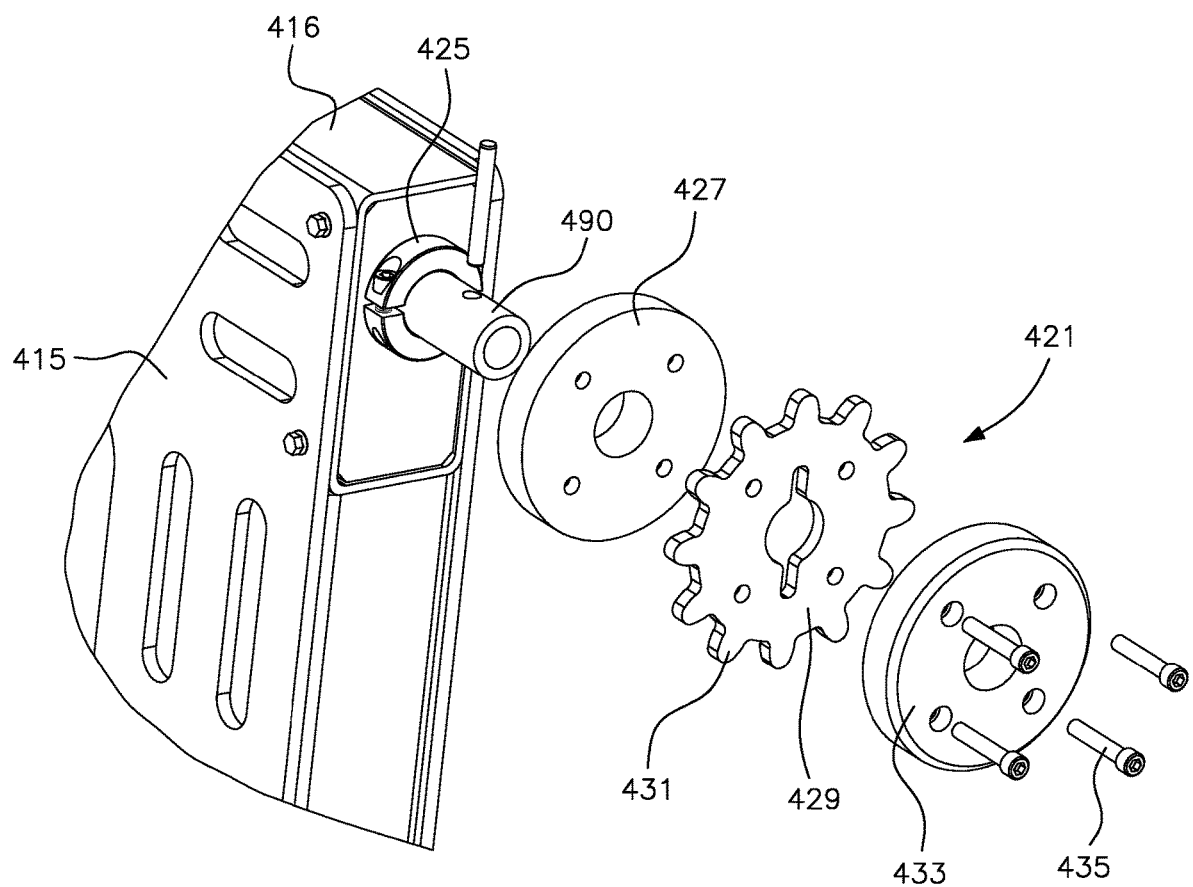
FIG. 9 is an exploded perspective view of the roller gate assembly as shown in FIG. 8, illustrating structural details of the right-hand side toothed roller.

Details of one of the first roller assembly 420 and the second roller assembly 421 shown in FIGS. 4, 5, and 6, i.e., of the second (or right-hand side) roller assembly 421, are shown in FIGS. 7, 8, and 9. FIG. 7 is an enlarged partial elevational view of the right-hand side 411 of roller gate assembly 401 as shown in FIG. 4 and FIG. 6, illustrating the right-hand side toothed roller and track 441 of the movable roller gate system. FIG. 8 is a further enlarged partial cross-sectional view of the roller assembly 421 as shown in FIG. 7, illustrating details of the right-hand side 411 of roller gate assembly 401. And, FIG. 9 is an exploded perspective view of the second roller assembly 421 as shown in FIG. 8, illustrating structural details of the right-hand side toothed roller.

Per FIG. 7, the second roller assembly 421 comprises a second roller 481, which includes inside roller 427 having a substantially flat track-contact surface, a toothed insert 429, and an outside roller 433 also having a substantially flat track-contact surface. The toothed insert 429 has a plurality of teeth 431 protruding outwardly therefrom. As shown in FIGS. 8 and 9, a plurality of fasteners 435 secure together the aforementioned elements of second roller 481, i.e., the inside roller 427, the toothed insert 429, and the outside roller 433.

According to the above embodiment of the present invention, the first roller assembly 420 and the second roller assembly 421 are each described as being a multi-component assembly connected by fasteners, i.e., as including an inside roller, a toothed insert, an outside roller, and the fasteners. However, as can be appreciated by one skilled in the art, the first roller assembly 420 and the second roller assembly 421 could instead each be fabricated as an integral one-piece unit, such as, for example, by additive manufacturing (i.e., "3-D printing") or casting.

Similarly, although the inside roller and the outside roller of the roller assembly have been described herein as having a substantially flat track-contact surface, the rollers, or a single integral roller, could instead have a differently shaped track-contact surface, as long as the track-contact surface is functionally compatible with the roller track surface (described below).

Per FIGS. 7, 8, and 9, the right-hand side 411 of the roller gate assembly 401 includes a bearing block 425 that rotatably supports a right-hand side end of a rotatable roller shaft 490. The second roller assembly 421 is fixedly secured to the right-hand side end of the rotatable roller shaft 490, i.e., so that as the rotatable roller shaft 490 rotates within the bearing block, the second roller assembly 421 rotates as one with the rotatable roller shaft 490.

In the interest of simplicity, certain identical structural details of various elements of the present invention are not illustrated in detail herein. More specifically, for example, the first roller assembly 420 located on the left-hand side of the roller gate assembly 401 is the mirror-image structure of the above-described second roller assembly 421 located on the right-hand side of the roller gate assembly 401. That is, first roller assembly 420 located on the first or left-hand side of the roller gate assembly 401 comprises a corresponding first roller, which includes an inside roller, a toothed insert, and an outside roller, with the left-hand side toothed insert having a plurality of teeth protruding outwardly therefrom. And, roller assembly 420 includes a bearing block that rotatably supports a left-hand side end 410 of the rotatable roller shaft 490, with the roller assembly 420 being fixedly secured to the left-hand side end 410 of the rotatable roller shaft 490.

Referring again now to FIG. 4, the left-hand side 410 of roller gate assembly 401 includes first roller assembly 420 and first roller track 440, and the right-hand side 411 of roller gate assembly 401 includes second roller assembly 421 and second roller track 441. As shown in FIG. 5 and FIG. 6, the first roller track 440 and the second roller track 441 each include therein, respectively, an aligned plurality of openings 482, 483, with each of the openings 482, 483, being configured to receive therein and release therefrom a tooth of a corresponding roller's toothed insert. For example, as shown in FIG. 7, second roller track 441 includes a generally horizontally-oriented and substantially flat roller-contact surface 443, which is configured to smoothly contact the substantially flat track-contact surfaces of the above-described inside roller 427 and outside roller 433 as the roller gate assembly 401 moves along second roller track 441. As also shown in FIG. 7, as second roller assembly 421 rotates with shaft 490, a tooth 431 of the plurality of teeth on toothed insert 429 is received by a corresponding opening 483 in roller-contact surface 443 of roller track 441 so as to securely and smoothly move roller gate assembly 401 along second roller track 441. According to a preferred embodiment of the present invention, the shape of an outer end of each of the plurality of teeth on a toothed insert is generally rectangular, and the shape of a corresponding opening in the roller-contact surface of the roller track is also generally rectangular, yet of slightly larger dimensions than the dimensions of the outer end of the tooth.

Although the roller tracks have been described herein as having a substantially flat roller-contact surface, which is configured to smoothly contact the substantially flat track-contact surfaces of the above-described inside roller and outside roller, the tracks could instead have a differently shaped roller-contact surface, as long as the roller-contact surface is functionally compatible with the track-contact surfaces of the rollers.

To ensure that each of left-hand side 410 and right-hand side 411 of roller gate assembly 401 travel together in unison along first roller track 440 and second roller track 441, each of the openings 482 of first roller track 440 is aligned with a corresponding one of the openings 483 of second roller track 441. And, similarly, each of first roller assembly 420 and second roller assembly 421 is secured on rotatable roller shaft 490 in an identical position so as to ensure that each of the teeth of first roller assembly 420 is aligned with a corresponding one of the teeth of second roller assembly 421. Again, as described herein, because the toothed rollers operate in unison, the entire width of the roller gate assembly, which is oriented substantially perpendicular to a longitudinal axis of the trailer or railroad car, is enabled to consistently move in a direction that is substantially parallel to the longitudinal axis of the trailer or railroad car, thereby avoiding any possibility of the skewing that characterizes the above-described prior art roller gates.

According to one embodiment of the present invention, the material of construction of the roller tracks is an aluminum (as described below), and the aluminum employed is one that can be extruded to form the roller track. As can be appreciated by one skilled in the art, the openings of each of the roller tracks can be fabricated by one or more of various methods, including, for example, casting, machining, and laser cutting.

In general, the various structural details of first roller track 440 and second roller track 441, and of first roller assembly 420 and second roller assembly 421, are determined based on the interior dimensions of trailer body and the service details of the roller gate assembly 401. For example, the diameter of the toothed insert of a roller assembly may be determined in part based on the available vertical spacing between the roller tracks and a side header of the trailer body. That is, because the roller gate assembly 401 is installed by first lifting it, and then placing it in the roller tracks, there is only a certain amount of vertical space in which to operate.

In terms of the pitch of the plurality of teeth 431 of the toothed insert, according to one embodiment of the present invention, a tooth pitch of 1.00 inch is employed. The 1.00-inch pitch was selected in order to keep the teeth spaced tightly enough together so as to provide constant tooth contact with the roller track, and thus ensure smooth operation, yet while also keeping the teeth spaced far enough apart so as to employ 0.50-inch openings in the roller track. The 0.50-inch openings in the roller track is a typically employed dimension in livestock hauling design, and is based at least in part on ensuring that livestock manure can fall through (or, be washed out though) a roller track opening. In addition, the use of 0.50-inch openings in the roller track is compatible with standard metal fabricating operations.

According to one embodiment of the present invention, the toothed insert has 12 teeth. As is known to one skilled in the relevant art, the 12-tooth embodiment is simply a function of the selected diameter of the toothed insert and the pitch, i.e., the spacing between openings, of the roller track.

The above-described details of the pitch of the plurality of teeth of the toothed insert, the spacing of openings in the roller track, and the number of teeth on the toothed insert, are all associated with but one possible embodiment of the present invention. As can be appreciated by one skilled in the art, depending upon the various structural and functional details on any particular livestock vehicle body, other pitch dimensions, numbers of teeth, and opening spacings may be possible. The determination of such details of the roller assemblies and the tracks is well within the ability of those skilled in the art of rack and pinion devices.

With regard to the material of construction of the first roller assembly 420 and the second roller assembly 421, according to one embodiment of the present invention, the material of construction of the toothed insert 429 is a stainless steel. The use of a stainless steel provides for both smooth and uniform rolling of the roller assembly within the roller track, and the durability required to provide for an extended life of the toothed insert. According to the same embodiment of the invention, the material of construction of the inside roller 427 and the outside roller 433 is a polymeric material, and the material of construction of the roller track 440 and the roller track 441 is an aluminum.

Figure 11:
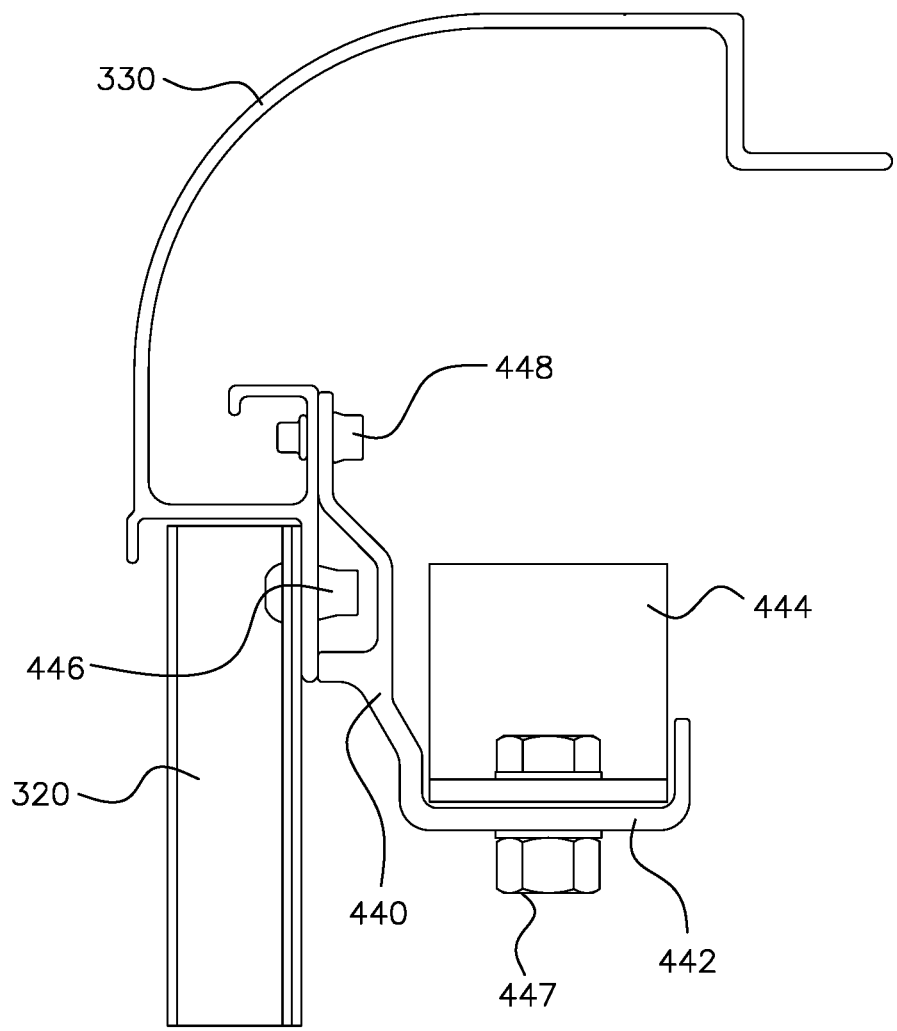
FIG. 11 is an enlarged partial elevational view of the track as shown in FIG. 4 and FIG. 5, illustrating a roller stop used in conjunction with the left-hand side track of the movable roller gate system.

FIG. 11 is an enlarged partial elevational view of the first track 440 as shown in FIGS. 4 and 5, and illustrates in part a roller stop 441 configured to stop travel of roller gate assembly 401 at a prescribed end location along the roller track. Roller stop 441 is secured to first track 440 via fastener 447. As also shown, first track 440 is mounted to a left-hand side header 330 of interior crossmember 310 of the roof of trailer body 300 and secured thereto via fastener 448. The left-hand side header 330, including the attached first track 440, is mounted to left-hand side wall 320 and secured thereto via fastener 446. The first track 440 is, of course, secured to left-hand side corner section 330 and secured to left-hand side wall 320 at a plurality of locations along the length of first track 440 so as to provide for the requisite amount of structural strength to support a plurality of roller gate assemblies 401 suspended thereon.

Figure 10:
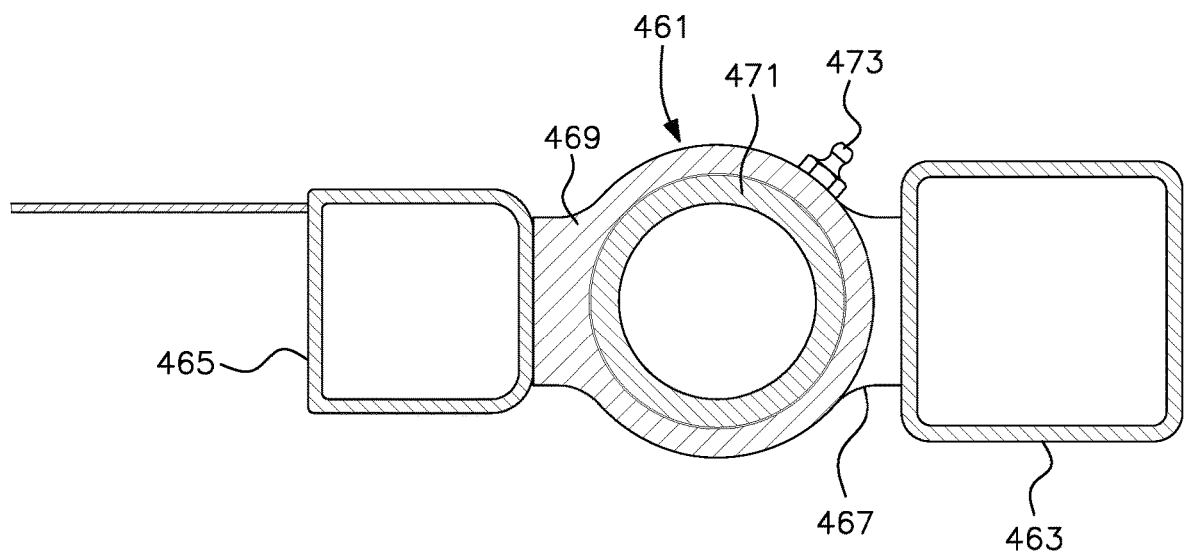
FIG. 10 is a cross-sectional view of a swing gate frame, a swing gate hinge, and a roller gate frame of the roller gate shown in FIG. 4.

Referring again to FIGS. 4, 5, and 6, according to one embodiment of the present invention, the roller gate assembly 401 includes roller gate 415, roller gate frame horizontal crossmember 416, roller gate frame left-hand side vertical member 417, roller gate frame right-hand side vertical member 418, and roller gate hinge assembly 461. FIG. 10 illustrates details of the above-described embodiment of the present invention, i.e., the elements of roller gate hinge assembly 461, including a roller gate frame element 463, a swing gate frame element 465, a roller gate hinge 467, a swing gate hinge 469, a pivot tube 471, and a grease fitting 473. The roller gate 415 of each roller gate assembly 401 is configured to swing open and closed so as to facilitate entry of livestock or personnel therethrough.

According to the above embodiment of the present invention, element 415 is described as a roller gate. However, as can be appreciated by one skilled in the art, element 415 could be any of various other types of divider that would function to divide the livestock vehicle into livestock containment compartments. For example, instead of being a swing-type roller gate, the divider could be any of, for example, a slider gate, a rollup gate, a drop ramp, a permanent divider, or one or more combinations of the aforementioned.

Referring once again to FIGS. 4, 5, and 6, the roller gate assembly 401 includes, according to a preferred embodiment of the invention, at least two roller gate assembly securement devices on each of the left-hand side 410 and the right-hand side 411 of the roller gate assembly 401. As shown, for example, in FIG. 4, according to one possible embodiment of the invention, the left-hand side 410 of the roller gate assembly 401 includes top and bottom securing elements 450 and top and bottom securing pins 452. The right-hand side 411 of the roller gate assembly 401 includes top and bottom securing elements 451 and top and bottom securing pins 453. Once the roller gate assembly 401 is positioned in a desired location along the length of trailer body 300, to secure the roller gate assembly, the top and bottom securing elements 450, for example, are first configured to engage with corresponding receiving elements (not shown) on the interior of exterior side 320. Once the top and bottom securing elements 450 have engaged with the corresponding receiving elements, the top and bottom securing pins 453 are inserted therein to secure the roller gate assembly in the desired location.

As described herein, in order to solve the prior art problem of gate tilting, another feature of one embodiment of the present invention is that the roller gate assembly has toothed rollers that are in line with the center of gravity of the roller gate assembly when hanging substantially vertically. In general, as noted above, the roller gate assembly includes at a top thereof a gate frame crossmember which houses a rotatable roller shaft that extends generally in a horizontal direction from one interior side of the trailer to the other interior side of the trailer.

More specifically, as described herein, the left-hand side 410 and the the right-hand side 411 of the roller gate assembly 401 each include a bearing block that rotatably supports, respectively, a left-hand side 410 end and a right-hand side 411 end of a rotatable roller shaft 490. The first roller assembly 420 and the second roller assembly 421 are fixedly secured to, respectively, the left-hand side end 410 and the right-hand side end 411 of the rotatable roller shaft 490, i.e., so that as the rotatable roller shaft 490 rotates within the bearing blocks, both the first roller assembly 420 and the second roller 421 assembly rotate as one with the rotatable roller shaft 490. Because first roller assembly 420 and second roller assembly 421 are attached to roller shaft 490, and because roller shaft 490 is housed within roller gate frame horizontal crossmember 416 located at the top of roller gate assembly 401, the first roller assembly 420, the second roller assembly 421, and the roller shaft 490 are all positioned so as to be in line with the center of gravity of the roller gate assembly 401 when hanging substantially vertically. As a result, when the roller gate assembly 401 is pushed or pulled during positioning, tilting of the gate is minimized.

According to the embodiment of the present invention described above, the left-hand side 410 and the right-hand side 411 of the roller gate assembly 401 each include a bearing block that rotatably supports, respectively, a left-hand side 410 end and a right-hand side 411 end of a rotatable roller shaft 490. However, as can be appreciated by one skilled in the art, instead of employing bearing blocks, the rotatable roller shaft could be supported by, for example, ball bearings, or any other device available to one skilled in the art that would rotatably support the roller shaft.

And, also according to the embodiment of the present invention described above, the roller gate assembly includes at a top thereof a gate frame crossmember which houses therein the rotatable roller shaft. However, as can be appreciated by one skilled in the art, other configurations of locating the rotatable roller shaft are possible. For example, instead of the rotatable roller shaft being housed within the gate frame crossmember, the rotatable roller shaft could instead be positioned above the roller gate frame, i.e., not housed within the roller gate frame. The important structural and functional point is that the rotatable roller shaft be positioned, in conjunction with its associated roller assemblies, in line with the center of gravity of the roller gate assembly when hanging substantially vertically, so as to minimize tilting of the roller gate assembly.

The present invention also provides a method of operating a roller gate system 400 as described herein. In general, according to one embodiment of the present invention, the method includes the following steps. First, if a roller gate assembly 401 is secured in place, the user disengages each of the roller gate assembly securement devices on either the left-hand side 410 or the right-hand side 411 of the roller gate assembly 401. Then grasping the roller gate assembly 401 by at least one hand, the user moves to the opposite side of the trailer body 300 and uses the other (i.e., free) hand to disengage each of the roller gate assembly securement devices on said side of the trailer body 300. The user then simply pushes or pulls the roller gate assembly 401 to the new desired location within the trailer body 300. Once the roller gate assembly 401 is positioned in the desired location, the user continues to grasp the roller gate assembly 401 with one hand while using the other hand to engage each of either the left-hand side 410 or the right-hand side 411 roller gate assembly securement devices. The user then simply moves to the opposite side of the trailer body 300 and engages each of the remaining roller gate assembly securement devices so as to secure the roller gate assembly in its new location.

In summary, the advantages provided by the rack and pinion roller gate system of the present invention are numerous. First, by virtue of the rack and pinion system, the skewing problem associated with prior art gates is overcome. Because the toothed rollers move in unison along their respective tracks, one end of the roller gate assembly cannot advance either forward or backward without the other end moving along with it. As a result, the roller gate assembly can be moved in a smooth, uniform, and predictable manner. And, as a result of the smooth, uniform, and predictable movement of the roller gate assembly, the movement of the roller gate assembly is easy for a single user, even, for example, when using only one hand. And, because the toothed rollers operate in unison, the entire width of the roller gate assembly, which is oriented substantially perpendicular to a longitudinal axis of the trailer or railroad car, is enabled to consistently move in a direction that is substantially parallel to the longitudinal axis of the trailer or railroad car, thereby avoiding any possibility of the skewing that characterizes the above-described prior art roller gates.

Furthermore, by virtue of having the toothed rollers in line with the center of gravity of the roller gate assembly when hanging substantially vertically, the tilting problem associated with prior art gates is overcome. As a result, when being moved along the tracks, the roller gate assembly remains in a substantially vertical orientation, which facilitates smooth, uniform, and predictable movement. In addition, because the roller gate assembly remains in the substantially vertical orientation during its travel along the tracks, once the roller gate assembly reaches its desired position, securement of the roller gate assembly is easy and fast. In fact, because the roller gate assembly remains in the substantially vertical orientation at its new position, securing the roller gate assembly is easy for a single user, since only one hand is needed to hold the gate in position.

Furthermore, by virtue of the structural details and functionality of the roller gate system described herein, the present invention provides a method of operating a roller gate assembly in a smooth, uniform, and predictable manner that is easy for a single user, even, for example, when using only one hand.

The foregoing description, and the drawings, are considered as illustrative only of the principles of the present invention. For example, the toothed insert and the tooth-receiving openings in the roller track may be configured in a variety of corresponding sizes, shapes, and quantities. Even more specifically, the shape of the tooth end and the corresponding shape of the roller track opening may be different from that described herein as long as the shape is consistent with the principles of operation described herein.

Furthermore, since numerous modifications and changes may readily occur to those skilled in the art, it is not desired to limit the invention to the exact construction and operation described and shown.

What is claimed is:

1. A rack and pinion roller gate system for a livestock transportation vehicle, said system comprising:
    a roller gate assembly including a roller divider, a roller gate frame, a first and a second roller assembly, and a rotatable roller shaft disposed between the first and the second roller assembly; and
    a first and a second roller track upon and along which the roller gate assembly is movable forward and backward,
    the first and the second roller assembly each including, respectively, a first and a second roller having a plurality of teeth protruding outwardly therefrom, the first and the second roller being fixedly disposed on, respectively, a first and a second end of the rotatable roller shaft,
    the first and the second roller track each including a plurality of openings therein, each of the openings being configured to receive therein and release therefrom a tooth of a corresponding roller as the first and second rollers rotate in unison via the rotatable roller shaft so as to move the roller gate assembly.

2. The rack and pinion roller gate system according to claim 1, wherein the roller gate frame includes a horizontal crossmember, and wherein the rotatable roller shaft is disposed within the horizontal crossmember so as to be located in line with a center of gravity of the roller gate assembly when hanging substantially vertically.

3. The rack and pinion roller gate system according to claim 1, wherein the first and second roller each include an inside roller, a toothed insert, and an outside roller.

4. The rack and pinion roller gate system according to claim 1, wherein the first and second roller assembly each include a bearing block that rotatably supports a corresponding end of the rotatable roller shaft.

5. The rack and pinion roller gate system according to claim 1, wherein a first end of the roller gate assembly includes a first bearing block that rotatably supports a first end of the rotatable roller shaft, and a second end of the roller gate assembly includes a second bearing block that rotatably supports a second end of the rotatable roller shaft.

6. The rack and pinion roller gate system according to claim 5, wherein the first roller assembly is fixedly secured to the first end of the rotatable roller shaft, and the second roller assembly is fixedly secured to the second end of the rotatable roller shaft, so that as the rotatable roller shaft rotates within the first and second bearing blocks, the first roller assembly and the second roller assembly correspondingly rotate as one with the rotatable roller shaft.

7. The rack and pinion roller gate system according to claim 3, wherein the material of construction of the inside roller and the outside roller is a polymeric material, and the material of construction of the toothed insert is a stainless steel.

8. The rack and pinion roller gate system according to claim 1, wherein the material of construction of the first and the second roller track is an aluminum.

9. The rack and pinion roller gate system according to claim 1, wherein each of the first roller assembly and the second roller assembly is secured on the rotatable roller shaft in an identical position so as to ensure that each of the teeth of the first roller assembly is aligned with a corresponding one of the teeth of the second roller assembly.

10. The rack and pinion roller gate system according to claim 1, wherein each of the plurality of openings in the first roller track is aligned with a corresponding one of the plurality of openings in the second roller track.

11. The rack and pinion roller gate system according to claim 1, wherein the roller divider is a hinged gate that is openable and closable.

12. A roller gate system for a livestock transportation vehicle, said system comprising:
a roller gate assembly including a roller gate, a roller gate frame, a first and a second roller assembly, and a rotatable roller shaft disposed between the first and the second roller assembly; and
a first and a second roller track upon and along which the roller gate assembly is movable forward and backward, the first and the second roller assembly and the rotatable roller shaft being located in line with a center of gravity of the roller gate assembly when hanging substantially vertically.

13. The roller gate system according to claim 12, wherein the first roller assembly is fixedly secured to a first end of the rotatable roller shaft, and the second roller assembly is fixedly secured to a second end of the rotatable roller shaft.

14. The roller gate system according to claim 13, wherein the first and the second roller assembly each include an integral one-piece roller.

15. A livestock transportation vehicle comprising:
a trailer having multiple interior compartments for separating animals; and
a roller gate system having a roller gate and a pair of roller assemblies supporting said roller gate and fixedly interconnected by a rotatable roller shaft;
said roller assemblies each riding in a complementary roller track inside said trailer;
at least one of said roller assemblies and its complementary roller track providing rack and pinion operation.

16. The livestock transportation vehicle according to claim 15, wherein both said pair of roller assemblies and complementary roller tracks provide rack and pinion operation.

17. The livestock transportation vehicle according to claim 15, wherein the rotatable roller shaft is located in line with a center of gravity of the roller gate when hanging substantially vertically.

18. The livestock transportation vehicle according to claim 15, wherein each of said pair of roller assemblies includes a bearing block that rotatably supports an adjacent end of the rotatable roller shaft.

19. The livestock transportation vehicle according to claim 15, wherein the rotatable roller shaft is disposed within a horizontal crossmember above the roller gate.

20. A method of operating a rack and pinion roller gate system for a livestock transportation vehicle, the system including a roller gate, first and second rollers supporting said roller gate and having a plurality of identical teeth protruding outwardly therefrom, a rotatable roller shaft fixably secured adjacent its ends to said first and second rollers, and first and second roller tracks having a plurality of identical and aligned track openings which match said roller teeth;
said method comprising moving said roller gate so that each of said first and second rollers move in unison as said roller teeth of said rollers are simultaneously received in and released from their respective track openings.

* * * * *